April 14, 1953     P. ASCHWANDEN     2,634,657
BEVEL GEAR CUTTING MACHINE

Filed April 6, 1948     4 Sheets-Sheet 1

Inventor:
Paul Aschwanden
by Sommers & Young
Attorneys

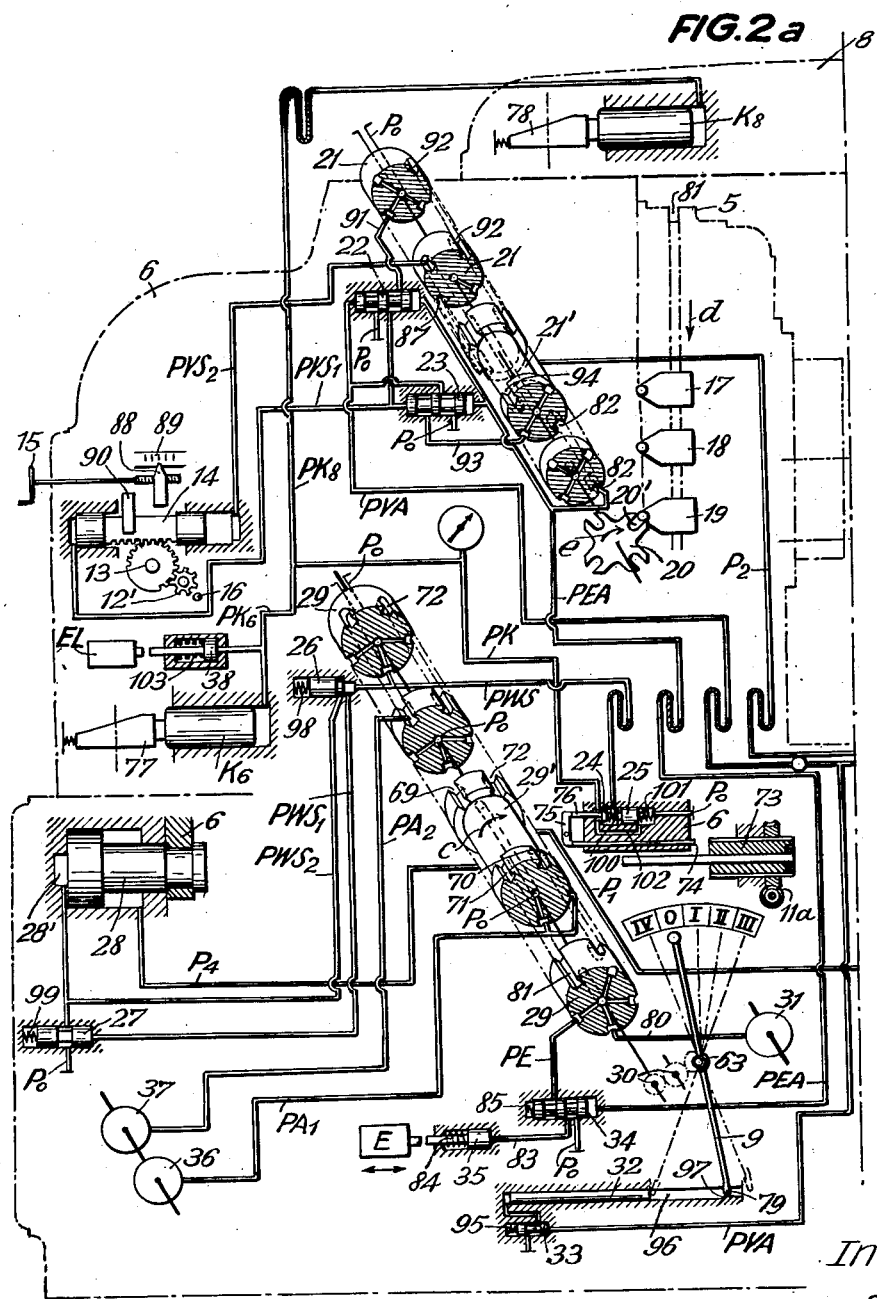

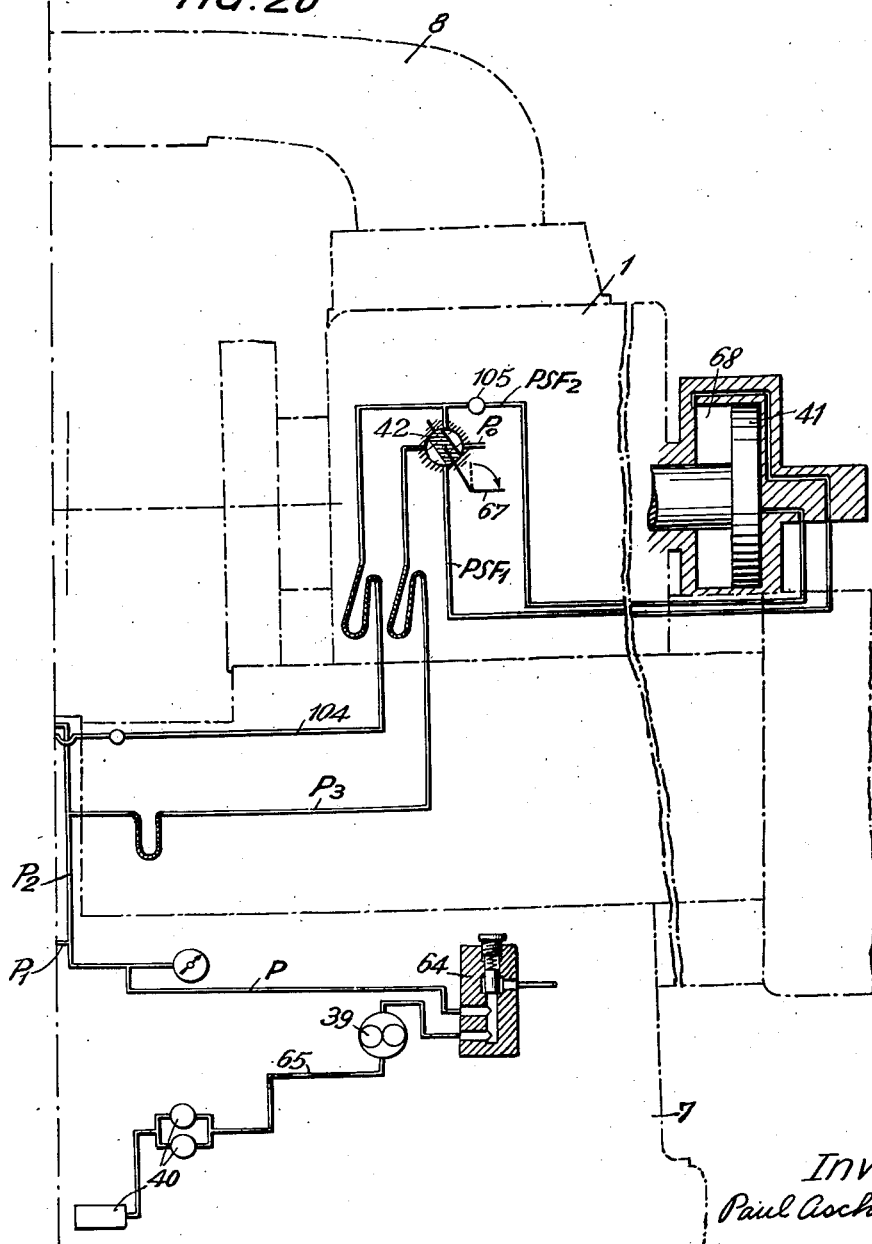

Patented Apr. 14, 1953

2,634,657

UNITED STATES PATENT OFFICE 2,634,657

BEVEL GEAR CUTTING MACHINE

Paul Aschwanden, Zurich, Switzerland, assignor to Verwaltungsgesellschaft der Werkzeugmaschinenfabrik Oerlikon, Zurich-Oerlikon, Switzerland Application April 6, 1948, Serial No. 19,225
In Switzerland April 11, 1947

10 Claims. (Cl. 90—5)

This invention relates to machines for cutting bevel wheels, particularly to that type operating according to the continuous dividing and generating process, but which may also be used for other machining methods. The invention has as object the provision of a completely automatic control of the machine, once this latter has been set for machining a gear blank, requiring very little attendance during the entire machining operation for the production of a bevel wheel.

Gear cutting machines of the above type usually comprise a work head unit carrying the gear blank and a generating unit including a generating drum which carries the tool, the two units being arranged for relative movement towards and away from each other into operating position or into a position of rest in which the various adjustable members of the machine are set for the next following cutting operation.

According to the invention the machine comprises a pressure fluid control system using a single operating lever coupled with a main control valve for the pressure fluid to control the main drive of the machine, the advance and return movement of the tool relatively to the gear blank in the direction of the axis of the ideal crown wheel of the gear to be cut, and also the feed or generating gear of the machine.

The same operating lever may be used to control a rapid speed for accelerating the return roll of the generating drum to its starting position when the tool has finished its generating feed motion at the end of a cutting operation.

An auxiliary control valve for the pressure fluid can be disposed in the generating unit for cooperation with abutments on the generating drum which operate the control valve in such manner that for example an increased feed or generating motion speed is obtained after the tool has worked out the full depths of the tooth space on the blank and that the operating lever of the main control valve is automatically moved to the position of starting the above mentioned increased return speed or for stopping the main drive after a cutting operation has been terminated.

A preferred example of the invention is illustrated in the accompanying drawings.

Figures 2a and 2b are a diagrammatic representation of the hydraulic control system of the machine.

Figure 1:
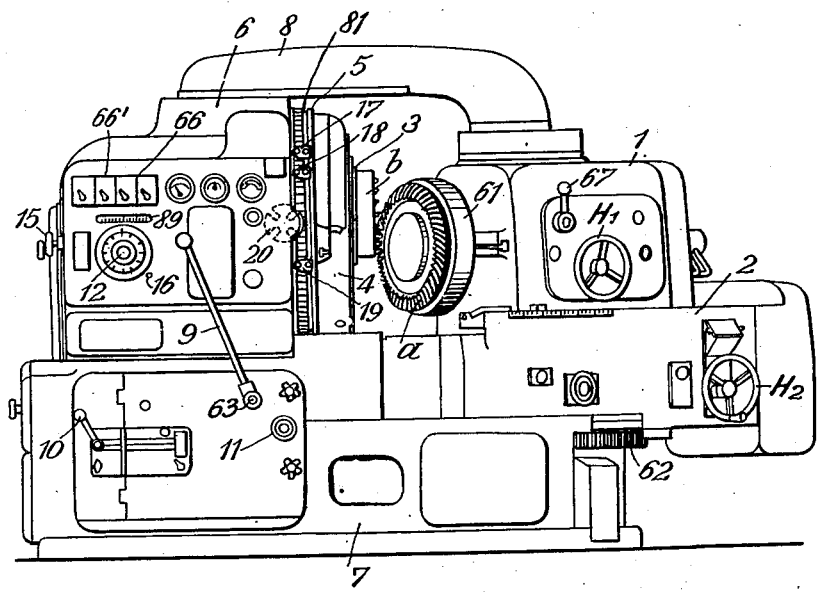
Fig. 1 is a general view of a machine for cutting bevel gears, operating according to the continuous dividing and generating process.

In Fig. 1 the numeral 1 indicates the horizontally movable head stock of the machine which contains a rotatable screw carrying the clamping chuck 61 for the work piece or gear blank $a$. The head stock 1 is carried by a pivoting table 2 which can effect an angular movement in a horizontal plane about a vertical axis. A hand wheel $H_2$ which actuates a gear meshing with a fixed gear segment 62 serves for adjusting the pivoting table. The tool carrier 3 is disposed in a cross slide 4 the movement of which serves to adjust the excentricity of the tool axis relatively to the axis of the blank $a$. The cross slide 4 is carried in turn by the generating drum 5 having a peripheral gear and which is rotatably disposed in the generating unit 6, which is horizontally movable on the machine bed 7. 8 indicates an overhead tie which is mounted on the work head unit 1 and on the generating unit 6 so as to be movable relatively thereto and to be locked to these two units, in order to constitute a supplementary connection of these two parts in operating position to increase the rigidity of the machine and accordingly the precision of the machining operation.

Figure 3:
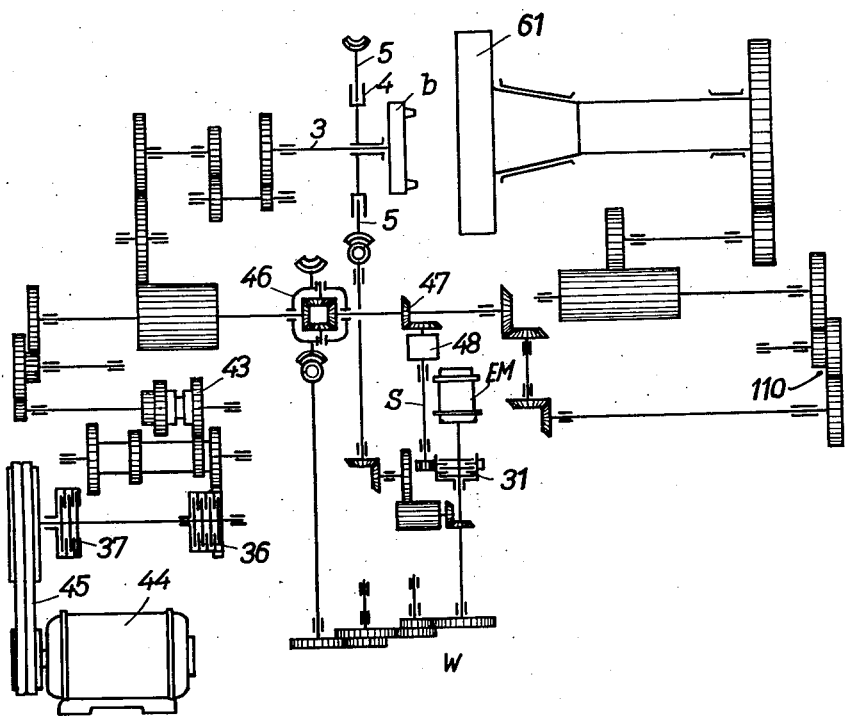
Figure 3 is a diagrammatic representation of the movable driving elements of the machine.

The drive of the machine is effected by a main driving motor 44 (Fig. 3) which imparts rotation by the intermediary of a belt 45, clutch 36 and change speed gear 43 to the tool $b$, and by the intermediary of an indexing gear 110 to the chuck 61 (Fig. 3). The transmission to the indexing gear 110 includes a differential gear 46. A generating gear W operatively connects the differential gear 46 with the generating drum 5. A bevel gear 47 transmits movement from the differential gear by the intermediary of a feed gear S and a clutch 31 to the generating gear W which is also connected to a rapid speed motor EM. All control functions of the fluid control system for operating the machine are released by means of a single main control lever 9. 10 is a hand lever for controlling the change speed gear inserted in the main drive of the machine. The disposition of the gear of the machine corresponds to the gear which is diagrammatically represented in my copending application Ser. No. 10,813.

As shown in Fig. 2a, the main control lever 9 can be brought to five positions 0, I, II, III, IV. It is pivotally mounted at 63, and its movement is transmitted by transmission wheels 30 to the axis of the main control valve 29 formed as a rotating piston valve. For the sake of clearness of its operation, this control valve is diagrammatically represented in drawn apart portions; in reality it forms a single piston provided with the corresponding flow ducts for the control fluid. This valve is connected by a conduit P1 to the pressure conduit P fed with pressure oil from a gear pump 39 through a pressure valve 64. The suction side of the pump 39 is connected by the conduit 65 to filtering devices 40 which are disposed in the machine bed 7 serving as oil reservoir.

An auxiliary control valve 21 also formed as rotating piston valve is disposed in the generating unit 6. This auxiliary control valve is represented in the same manner as the main valve 29, for the sake of clearness, in drawn apart portions. It is connected by the flexible conduit P2 to the pressure conduit P of the pump 39. On the axis of the control valve 21 is seated a star-shaped cam or Maltese cross 20 which cooperates with three adjustably fixed cam driving abutments 17, 18 and 19 on the generating drum 5.

When starting the machine, the control lever 9 is in the position 0 as represented in Fig. 2a. By actuation of the electric contacts 66 (Fig. 1) the main drive motor 44 and the pressure oil pump 39 are started. The pump 39 delivers pressure oil through the conduit P into the conduits P1 and P2, as well as into a conduit P3 leading to a control valve 42 for the clamping chuck 61 of the blank $a$. This valve 42 is moved by a lever 67. When the blank is chucked the valve 42 is in the position represented in Fig. 2b, in which the pressure conduit P3 is connected to a conduit PSF1 which delivers pressure oil into a cylinder 68, so as to maintain a piston 41 connected with the clamping chuck in the represented position in which the gear blank is chucked. When the blank is released the valve 42 is situated in a position turned through 90° in which it connects the pressure conduit P3 with the conduit PSF2 which delivers pressure oil to the other side of the piston 41 and moves this latter towards the left, while the conduit PSF1 is connected to the discharge Po leading to the fluid reservoir.

Pressure oil from the conduit P1 delivering into the annular chamber 29' of the valve 29 arrives through the duct 69 of the control valve into the conduit PA2 which delivers pressure to a braking device 37 of the main drive and applies the brake, while the main drive clutch 36 is connected with the central discharge Po of the control valve 29 through the conduit PA1 and is out of operation. The head stock 1 of the machine has been brought to an exactly predetermined position by actuation of the hand wheels H1 and H2 and clamped in this position. The tool $b$ is fixed to the tool carrier 3 and adjusted by means of the cross slide 4 to the predetermined eccentric position relatively to the axis of the generating drum 5 and is then clamped to the generating drum. The generating unit 6 is secured to a piston 28 which is subjected to fluid pressure by a conduit P4 communicating continuously with the pressure conduit P1, the pressure acting on the right hand face of the piston which is accordingly moved towards the left in Fig. 2a. In this position of the piston 28, the generating unit together with the tool is removed from the head stock 1 in the direction of the axis of the imaginary crown wheel of the gear to be made, and owing to the disengaged clutch 36 the main driving gear as well as the indexing gear 110 and the feed gear S and the generating gear W are at rest.

When now the control lever 9 is brought by hand to the position I the main control valve 29 turns through one step, owing to the transmission wheels 30, in the direction of the arrow $c$. This movement causes the conduit PA2 to be shut off from pressure and to be connected to the central discharge Po of the control valve 29, so as to release the brake 37. The conduit PA1 is now connected by the duct 70 of the control valve with the pressure conduit P1, whereby the main drive clutch 36 becomes engaged. The main driving gear and the indexing gear 110 are operatively connected with the previously started driving motor and the tool as well as the blank start to rotate.

The control valve 21 in the generating unit 6 is now in the represented position of rest. The conduit PEA is connected by the duct 82 of this valve with the pressure conduit P2 delivering fluid under pressure to the annular chamber 21' of the valve. The oil pressure acts on a pilot piston 34 which controls an electric switch E of a motor for a rapid speed gear the function of which is described later and maintains the piston in the represented position in which the right side of a switch operating piston 35 is connected by the conduit 83 with the discharge Po, so that the spring 84 moves the piston 35 towards the right and the switch E is operated to cut-off the circuit of the rapid speed motor.

The control lever 9 is now brought to the position II and the main control valve 29 rotated through a further step. The conduit PA1 leading to the main drive clutch 36 remains connected by the ducts 70 and 71 with the pressure conduit P1 and the conduit PA2 leading to the brake 37 remains connected to the discharge Po. The conduit PWS is connected by the duct 72 of the control valve 29 with the pressure conduit P1. A non-return valve 26 is moved towards the left and the conduits PWS1 and PWS2 receive pressure. The conduit PWS1 leading to a piston valve 27 places this valve under pressure and moves the piston to close the discharge Po which communicated until now with the chamber 28' of the piston 28. Pressure fluid therefor arrives by the conduit PWS2 on the left side of the piston 28 and owing to the larger piston surface on this side, the piston 28 is moved towards the right whereby the generating unit 6 together with the tool $b$ is moved in the direction of the axis of the imaginary crown wheel towards the gear blank to be machined. In the most advanced position of the generating unit which is determined by an adjustable abutment 73 on the bed of the machine, the outer edges of the cutting blades of the tool $b$ are situated in the plane of the bottom of the tooth spaces of the gear to be cut, at the point of engagement of the tool blades and the work piece, or in the plane of the outer edges of the teeth of the imaginary crown wheel. However, the blades have not yet any cutting action, since the generating drum 5 is still rolled out of the position in which the blades become effective. The advancing movement of the generating unit 6 is limited by the adjustable abutment 73 on the bed of the machine, which can be displaced by means of a handwheel 11 (Fig. 1) and a worm gear 11a.

The pressure in conduit PWS is communicated to a piston valve 25 carried by the generating unit 6 and moves this piston towards the right in Fig. 2a so as to interrupt the previously existing communication between the discharge Po and a conduit PK. When the advancing generating unit 6 makes contact with the abutment 73 a sliding rod 14 carried by the generating unit and bearing against the abutment is moved towards the left and rocks a lever 75 which in turn moves a small piston 24 towards the right. Pressure fluid thus arrives from conduit PWS in the conduit PK to which are connected the conduits PK6 and PK8. The conduit PK6 leads fluid under pressure to a plurality of clamping pistons K6 which by means of wedges 77 lock the generating unit 6 in its advanced position which is the working position, by clamping it to the bed of the machine as soon as it arrives against the abutment 73. The conduit PK8 communicates the pressure to a clamping piston K8 which operates a clamping wedge 78 for locking the overhead tie 8 to the generating unit 6. The conduit PK6 also communicates pressure to a piston 38 which actuates an electric switch EL in the circuit of an electric motor driving a cooling agent pump. When a pre-selector switch 66' (Fig. 1) has been actuated to close the circuit, the motor is started and drives the pump to deliver a jet of cooling liquid against the tool which will soon begin its cutting action. When a material as for example cast iron is worked which does not need a cooling fluid, the pre-selector switch 66' is not moved to on-position so that an actuation of the switch EL by the moved piston 38 cannot close the motor circuit.

After clamping the generating unit 6 and the overhead tie 8, the machine is ready to start the cutting operation on the blank. The control lever 9 is now moved to the position III, in which its lower end 79 abuts against a shut-down piston 32. The control valve 29 is accordingly turned through a further step. The conduits PA1 and PWS remain under pressure. The clutch 31 which has been connected until now by the conduit 80 to the central discharge Po of the control valve 29, is now connected by the duct 81 of the valve to the pressure chamber 29' and the feed motion and generating gears S and W of the machine start to operate. This gear causes the rotation of the generating drum 5 about the axis of the imaginary crown wheel of the gear wheel to be cut and imparts the required well known supplementary movement of rotation also to the blank, which movement is the same as if the imaginary crown wheel were in mesh with the gear to be cut into the blank. Owing to rotation of the generating drum in the direction of the arrow $d$ the tool approaches the work-piece and eventually starts to cut into the blank.

The generating drum 5 is provided with a circumferential groove 81 in which are engaged three circumferentially adjustable abutments 17, 18 and 19. The abutment 19 is so adjusted that at the beginning of the movement of the generating drum 5 it engages immediately with one of the slots 20' of the Maltese cross 20 carried by the axis of the control valve 21 and turns by this latter through a quarter of one revolution in the direction of the arrow $e$. This quarter turn has no action on the operation of the machine. The conduit PEA is connected with the central discharge Po of the control valve 21. The pressure on the pilot piston 34 for the switch E is interrupted and the spring 85 moves the piston towards the right. The conduit 83, however, is now connected by the conduit PE with the central discharge Po of the main control valve 29 and the switch E remains not actuated. The conduit PVS2 is connected by the duct 87 of the valve 21 with the pressure conduit P2. The oil pressure acts accordingly on the right side of a piston 14 for the control of an automatic increase of the feed or generating speed. The rate of the normal feed speed can be adjusted in the beginning by means of a hand-wheel 12 (Fig. 1) connected with a pinion 12' which operates a train of gears controlling the speed variator of the feed motion drive. During the adjustment of the feed motion speed the wheel 12' can be disengaged from a transmission wheel 13 by means of a push member 16, the wheel 13 meshing with a gear rack of the piston 14. The desired increase of feed motion speed for the final period of the generating rolling movement is adjusted by means of a hand-wheel 15 and is made visible on a graduation 89. The hand-wheel 15 moves a stop 88 cooperating with an abutment 90 of the piston 14 as will be described later.

The generating drum 5 continues its movement of rotation and the tool $b$ engages deeper into the blank until the cutting blades of the tool have cut out the entire depth of the tooth spaces from the blank. At this moment the cutting of material from the blank is practically finished, the tool must only complete its generating rolling movement and an unimportant cutting operation is still effected along the tooth flanks only. In order to save time it is therefore possible to increase the feed motion or generating speed of the generating drum and accordingly also the supplementary speed imparted to the blank. For effecting the required control operations to obtain the increased generating speed the second abutment 18 has been correspondingly adjusted along the groove 81 of the generating drum 5. This second abutment now engages the Maltese cross 20 and imparts a further quarter of one revolution to the control valve 21. As result of this further step of the valve the conduit PVS1 receives pressure by being connected at the auxiliary piston 22 to the conduit 91 which now communicates by the duct 92 of the control valve 21 with the pressure chamber 21'. The conduit PVS2 communicates with the central discharge Po of the control valve 21 causing the piston 14 of the control device for the increase of the feed motion speed to be moved towards the right until the abutment 90 of the piston bears against the stop 88 which had been adjusted according to the desired increase of feed motion speed. The pressure in the conduit PVS1 has moved the auxiliary piston 23 towards the right. The conduit PEA is still connected to the discharge Po by the valve 21, while the conduit PVA is connected by the displaced auxiliary piston 23 with the central discharge Po of the control valve 21.

When the tool has finished its generating feed movement at increased speed, the third cam 17 engages the Maltese cross 20 and imparts a further quarter turn to the control valve 21 in the direction of the arrow $e$. Now the conduit PVS2 is connected again by a duct 92 of the control valve 21 with the pressure conduit P2, while the conduit PVS1 is connected by the auxiliary piston 22 and the conduit 91 with the discharge Po of the valve 21. The control piston 14 for the increased feed motion speed accordingly returns into the position shown in Fig. 2a and causes the increased feed motion speed to be disconnected. The conduit 93 leading to the control piston 23 is now connected by the duct 94 of the control valve 21 with the pressure conduit P2, and since the piston 23 is in its right hand position, fluid pressure arrives in the conduit PVA which leads to the pilot piston 33 of the shut-down piston 32 which coacts with the main operating lever 9. The piston 33 is moved against the action of its spring and pressure oil arrives on the left end of the piston 32 the other end of which makes contact with the lower end 79 of the control lever 9 in the position III. The piston 32 is displaced towards the right in the cylinder 96 by the pressure fluid until it arrives against a shoulder 97 and while acting against the lower end 79 of the lever 9 this latter is automatically returned to its starting position 0. The return of the lever 9 results in the return of the main control valve 29 to the starting position represented in Fig. 2a. The conduit 80 leading to the clutch of the feed motion gear is again connected with the discharge Po; the clutch is released and the feed or generating movement stops.

The conduit PWS to the non-return valve 26 is connected at the main control valve 29 with the discharge Po. The pressure on the left side of the control piston 25 for the clamping members K6 and K8 decreases, the pistons 24 and 25 are moved towards the left by their springs 100 and 101, and the conduit PK is connected with the discharge Po by the duct 102 which is now open. The pressure in the conduits PK6 and PK8 decreases and the clamping members K6 and K8 of the generating unit 6 and of the overhead tie 8 are released. The piston 38 is released from hydraulic pressure and returns by the action of its spring 103 into the represented position, while the switch EL for the motor of the cooling liquid pump is operated to stop the motor. At the same time the pistons 26 and 27 have been displaced towards the right by their respective springs 98 and 99 into the represented positions, and the left side of the main piston 28 of the generating unit 6 is thus connected with the discharge Po. Since the conduit P4 is always under pressure, the main piston 28 is displaced towards the left and returns the generating unit with the tool to the position of rest. The conduit PA1 is connected again with the discharge Po at the main control valve 29: the clutch in the main drive of the machine is released while the conduit PA2 which is again under pressure applies the brake 37. The main drive gear and the indexing gear of the machine are now stopped.

The main control lever 9 can now be brought by hand to a position IV. In the corresponding position of the valve 29 the conduit PE for the control of the rapid speed switch E is connected by the duct 81 of the control valve 29 with the pressure conduit P1, while the conduit PEA is connected with the discharge at the control valve 21 which is still in its third position of operation. The piston 34 is accordingly moved towards the right and fluid pressure acting through the conduit 83 on the piston 35 moves this latter against the action of its spring 84 to operate the electric switch E for a rapid speed motor. This motor is coupled with the feed motion or generating gear of the machine and drives this gear and the indexing gear at rapid speed and in the direction opposed to the direction of movement obtained by the main driving motor. The generating drum is now rolled back at increased speed to the ready-for-operation position and also the blank effects a return rotation.

In this position of rapid return speed the brake 37 of the main drive remains connected to the pressure conduit P1 through the conduit PA2 and the duct 72 of the valve 29, and the conduit PA1 leading to the main drive clutch 36 remains connected with the discharge. The generating drum 5 turning in opposite direction, the movements of the auxiliary valve 21 produced by the three abutments 17, 18 and 19 are effected in reversed succession than during the generating rolling movement of the generating drum 5, and the cam 17 engages first the Maltese cross 20 and turns this latter and the control valve 21 through one step in the direction opposite to the arrow e, and afterwards the cam 18 engages the Maltese cross and turns the control valve through a further quarter turn backwards. These two reverse movements of the control valve 21 do not initiate any control functions, the conduit PEA to the piston 34 remains connected to the discharge at the valve 21, and the piston remains in its displaced right hand position. The conduit PE is under pressure which acts through the conduit 83 on the switch actuating piston 35 which maintains the rapid speed motor switch in switched-on position.

After the cam 19 has also engaged the Maltese cross 20 and returned this latter through a further step, the control valve 21 is again in its position of rest. Now the conduit PEA is connected by the duct 82 of the valve 21 with the pressure conduit P2, the pilot piston 34 for the switch E is moved into the represented position towards the left and the conduit 83 is connected with the discharge Po at the piston 34. The spring 84 moves the piston 35 towards the right and the switch E for the rapid speed motor is actuated to shut the motor down. The control lever 9 can now be brought by hand to its starting position 0, so that the main control valve 29 is also returned to its starting position and the generating drum 5 will be in position ready for a new cutting operation. Since the abutment 19 has engaged and turned the Maltese cross 20 immediately at the beginning of the rolling movement of the generating drum 5, the generating drum 5 is again in its exact starting position as soon as the abutment 19 has returned the Maltese cross and the rapid speed gear has been stopped. It will be remarked that the return of the generating drum to its starting position is effected by a return rolling movement of the drum and not by a complete revolution of the same in the direction of the generating movement. This offers the advantage that when a gear blank is subjected to several successive machining operations, the same portions of all gears taking part in the driving and generating movements are meshing with each other during each cutting operation, so as to avoid that any possible small errors in the gearing may become effective at different positions of the tool relatively to the blank.

Already during the rapid speed for the reverse roll of the generating drum the machined blank can be removed from the chuck 61 by pivoting the lever 67 to release the piston 41 of the chuck from fluid pressure, and a new blank can be chucked. When this new blank is identical with the previously machined blank, the machine is immediately ready for operation without requiring any fresh adjustment of parts of the machine. The control lever 9 can be brought again from its position 0 through the position I and II into the position III and the machining of the new blank is automatically effected in the manner above described. It will be recognized that the efficiency of the machine is very high in that after adjustment of the blank and of the tool only the single main control lever 9 must be actuated in order to effect the entire machining operations on the blank.

According to a modification it is possible to construct the piston 32 for the return of the lever 9 in such manner that the lever 9 is automatically brought back from the position III until the position IV. The above described operations during the return of the lever 9 to the position 0 are repeated, but as soon as the backwards movement of the generating unit 6 starts, also the switch E of the rapid speed motor is actuated by the piston 35 placed immediately under fluid pressure, and the return roll of the generating drum is effected simultaneously with the backwards movement of the generating unit. A return of the lever 9 by hand from the position IV to the position 0 is not necessary. As soon as the rapid speed motor has been stopped a new blank can be chucked, and the lever 9 can be brought from the position IV through the positions 0-I-II immediately to the position III, and the above described operations will be automatically repeated until the second cutting operation is finished and the machine is again in the starting position.

The facility of increase of the speed of the generating rolling movement of the drum 5 is particularly advantageous when the blank is subjected to a roughing cut in a first cutting operation. However, when the cut blank for example is subjected to a successive finishing operation, it is possible to use an increased generating speed already from the beginning of the finishing cut, so that during this finishing operation no other increase of the generating rolling movement will be required. In this case the action of the second abutment 18 on the generating drum 5 can be suppressed when the machine is set for operation by placing the adjustable stop 88 against the stop 90 of the control piston 14 of the increased feed speed gear, so that upon movement of the auxiliary control valve 21 by the abutment 18 and upon connection of the conduit PVS1 with the pressure conduit P2 the piston 14 cannot be displaced.

It is visible from Fig. 2b that the conduit PSF2 which connects the valve 42 with the pressure cylinder 68 operating the clamping chuck for the blank, is connected by a conduit 104 with the conduit PVA for the valve 33 of the shut-down piston 32. This conduit 104 provides that the machine can only be started when the blank is chucked and that the drive of the machine will stop immediately when the blank would be dechucked for any possible reason. As long as the valve 42 is not in the position represented in Fig. 2b corresponding to the clamped chuck, but in the position shown in dotted lines and pressure fluid can flow through the conduit P3 into the conduit PSF2 and maintain the piston 41 at the left hand end of the cylinder 68 corresponding to release of the chuck, it is not possible to move the control lever 9 out of its starting position 0. The conduit PSF2 comprises a check valve 105, so that the pressure from the conduit P3, while the valve 42 is in the position shown with dotted lines, becomes effective first in the conduit 104 before it can move the piston 41. The pressure in the conduit 104 and the conduit PVA causes a movement of the pilot piston 33 towards the left so that the shut-down piston 32 is subjected to fluid pressure and positively moves the lever 9 to the position 0 or the position IV, as the case may be, or when the lever 9 is already in the position 0, the fluid pressure acting on the piston 32 locks the piston and the lever 9 in this position, so that it cannot be brought by hand to the positions I, II or III. Only when the valve 42 has been moved to the represented hatched position corresponding to clamping of the chuck, the conduit 104 is connected to the discharge Po, so that the piston 32 is released from fluid pressure and permits movement of the lever 9.

The auxiliary control valve 21 represented by way of example only is so constructed and the three adjustable abutments 17, 18, 19 are so disposed on the generating drum 5, that it is possible to produce bevel wheels having spiral teeth which are curved in one or the other direction, that is to say, that the generating drum can rotate in one or the other direction to effect the generating rolling movement, and by cooperation of the three abutments with the Maltese cross 20 without any reversal of control members, except a corresponding adjustment of the abutments, the correct control operations are initiated in both directions of rotation of the generating drum.

I claim:
1. A machine for cutting bevel gears comprising a work head unit carrying the work, a generating unit including a generating drum having a gear and carrying the tool, said two units being relatively movable towards and away from each other, main driving means for imparting rotation to said work and said tool, a feed gear imparting the generating rolling movement to said generating drum, a pressure fluid control system including a main control valve for controlling the operation of the machine, a single operating lever operatively connected to said main control valve and adapted to be brought by hand from a starting position to a position corresponding to operation of the machine, said main control valve being actuated by the movement of said operating lever to automatically engage said main driving means and said feed gear, an auxiliary pressure fluid control valve, an adjustable abutment on said generating drum adapted to engage and operating said auxiliary control valve at the end of the rolling movement of said generating drum to cause automatic return of said operating lever to starting position and actuation of said main control valve to disengage said main driving means and feed gear.

2. A machine for cutting bevel gears as claimed in claim 1, wherein said generating drum carries a second adjustable abutment adapted to engage and actuate said auxiliary control valve when the tool has cut the entire depth of the tooth spaces of the gear to be produced, to cause an increase of speed of said feed gear.

3. A machine for cutting bevel gears as claimed in claim 1 and comprising means for increasing the speed of said feed gear during operation of the machine, means for preselecting the rate of increase of the feed gear speed, and a second adjustable abutment carried by said generating drum, said second abutment being adapted to engage and actuate said auxiliary control valve when the tool has cut the entire depth of the tooth spaces of the gear to be produced, to cause engagement of said preselected increased speed of the feed gear.

4. A machine for cutting bevel gears comprising a work head unit carrying the work, a generating unit including a rotatable generating drum, having a gear and carrying the tool, said two units being relatively movable towards and away from each other, main driving means for imparting rotation to said work and to said tool, a feed gear imparting the generating rolling movement to said generating drum, means for imparting a return rolling movement at rapid speed to the generating drum, a fluid control system including a main control valve for controlling the operation of the machine, and a single operating lever coupled with said control valve for actuating said valve to automatically control said main driving means, said relative movement of the work head unit and the generating unit towards and away from each other, said feed gear for imparting generating rolling movement to said generating drum, and said return rolling movement of the generating drum when the gear generating movement is finished, said fluid control system including an auxiliary control valve, and said generating drum having an adjustable abutment fixed thereto, said abutment being adapted to engage and actuate the auxiliary control valve at the end of the generating rolling movement of said generating drum to cause automatic movement of said operating lever and of the main control valve coupled therewith to a position in which the main control valve initiates the return rolling movement of the generating drum.

5. A machine for cutting bevel gears comprising a work head unit carrying the work, a generating unit including a generating drum having a gear and carrying the tool, said two units being relatively movable towards and away from each other, main driving means for imparting rotation to said tool and work, a feed gear imparting generating rolling movement to said generating drum, means for imparting a return rolling movement at rapid speed to the generating drum, a fluid control system including a main control valve for controlling the operation of the machine, an operating lever coupled with said main control valve, an auxiliary control valve, pressure fluid operated means for automatically controlling said operating lever in response to movement of the auxiliary control valve, an abutment on the generating drum adapted to engage and actuate the auxiliary control valve at the beginning of the generating rolling movement of the drum, and a second abutment on the generating drum adapted to engage and actuate said auxiliary control valve at the end of the generating rolling movement of the drum to cause movement of said operating lever and main control valve to a position corresponding to engagement of said rapid return rolling speed of the generating drum, whereby said first mentioned abutment will again engage and operate the auxiliary valve in reversed direction to cause return of the operating lever and the main control valve to starting position.

6. A machine for cutting bevel gears comprising a work head unit carrying the work, a generating unit including a generating drum carrying the tool, said two units being relatively movable towards and away from each other, main driving means for imparting rotation to said tool and work, a feed gear imparting generating rolling movement to said generating drum, means for imparting a return rolling movement at rapid speed to the generating drum, a fluid control system including a main control valve for controlling the operation of the machine, an operating lever coupled with said main control valve, an auxiliary control valve, pressure fluid operated means for automatically controlling said operating lever in response to movement of the auxiliary control valve, three successively arranged abutments adjustably secured to said generating drum to rotate therewith, and cam means on said auxiliary control valve adapted to be successively engaged by said three abutments during the generating rolling movement of said drum and again during the return rolling movement of said drum, each abutment imparting one movement step to said auxiliary control valve upon being engaged with said cam means.

7. A machine for cutting bevel gears as claimed in claim 6, wherein the second of the said three successive abutments on the generating drum during the generating rolling movement of the drum moves said auxiliary control valve to cause engagement of an increase rolling speed of the drum, and the third abutment further moves the auxiliary control valve to cause disengagement of said increased rolling speed and engagement of the return rolling speed of the generating drum.

8. A machine for cutting bevel gears according to the continuous generating and indexing method, comprising a machine bed, a headstock, a work piece clamping chuck rotatably mounted on the headstock, a generating unit including a rotatable generating drum, a tool carrier slide mounted on the drum and movable transversely to the axis of the generating drum, and a rotatable tool carrier mounted in said slide, said generating unit and said headstock being movable towards and away from each other, a main drive motor, movement transmission means between said motor and said workpiece chuck, said generating drum and said tool carrier, a generating gear included in the movement transmission between said motor and said generating drum, an indexing gear included in the movement transmission between said motor and said work piece clamping chuck, a differential gear operatively connected with said generating gear and with said indexing gear, a feed gear for varying the speed of rolling movement imparted by the generating gear to the generating drum, a fluid control system including a rotary main valve and a rotary auxiliary valve for controlling the operation of the machine, a plurality of adjustable abutments circumferentially arranged on said generating drum, means mounted for rotation with said auxiliary valve and coacting with said abutments for turning said auxiliary valve into different control positions, a single manually operable control lever operatively connected with said main valve for imparting rotary motion thereto, fluid operated servomotor means for moving said generating unit relatively to said headstock, fluid operated clutch means for engaging and disengaging said main drive motor with and from said movement transmission means, and valve means for operating said servomotor means and clutch means in response to rotary movement of said main and auxiliary valves, whereby operation of said single control lever is effective to control movement of said generating drum, said tool carrier, said workpiece chuck, said main drive clutch means and said servomotor means.

9. A machine for cutting bevel gears comprising a work head unit carrying the work, a generating unit including a rotatable generating drum carrying the tool, the generating unit being movable towards and away from said work head unit in the direction of the axis of the ideal crown wheel of the gear to be cut to be brought into a setting position and a working position, a fluid control system including a main control valve for controlling the operation of the machine, a single operating lever for said control valve, pressure fluid operated clamping members for locking said generating unit in the working position, an adjustable stop member for limiting the movement of the generating unit towards the work head unit, a piston valve controlling the operation of said clamping members, actuating means for said piston valve operative upon abutment of the generating unit against said adjustable stop member to cause pressure fluid to be supplied to said clamping members for locking the generating unit in its working position, an overhead tie connecting the generating unit and the work head unit, pressure fluid operated clamping members for locking said overhead tie to the two units, and pressure fluid connections between said clamping members and said piston valve to cause pressure fluid to be supplied to said clamping members to lock said overhead tie upon abutment of the generating unit against said adjustable stop member and actuation of said piston valve.

10. A machine for cutting bevel gears as claimed in claim 9, wherein said control piston for the main valve operating lever is effective in response to relief of clamping pressure on the chuck to return the operating lever to its starting position.

PAUL ASCHWANDEN.

References Cited in the file of this patent

UNITED STATES PATENTS

| Number | Name | Date |
| --- | --- | --- |
| 2,099,674 | Bullock et al. | Nov. 23, 1937 |
| 2,395,544 | Galloway | Feb. 26, 1946 |
| 2,398,346 | Anderson | Apr. 16, 1946 |
| 2,483,810 | Cotta | Oct. 4, 1949 |
| 2,489,227 | Roehm et al. | Nov. 22, 1949 |